United States Patent [19]

Belloc et al.

[11] 3,875,005

[45] Apr. 1, 1975

[54] THROMBOLYTIC AND FIBRINOLYTIC ENZYME FROM STREPTOMYCES

[75] Inventors: Andre Belloc, Vanves; Jean Florent; Jean Lunel, both of Paris; Denise Mancy, Charenton; Jean Verrier, Boulogne-sur-Seine, all of France

[73] Assignee: Rhone-Poulenc S.A., Paris, France

[22] Filed: July 25, 1972

[21] Appl. No.: 275,091

[30] Foreign Application Priority Data
July 27, 1971 France .............................. 71.27449
June 12, 1972 France .............................. 72.21092

[52] U.S. Cl. ............... 195/62, 195/66 R, 195/66 B, 424/94
[51] Int. Cl. ......................... C07g 7/02, C07g 7/028
[58] Field of Search .......... 195/62, 66, 66 B; 424/94

[56] References Cited
UNITED STATES PATENTS 3,127,327  3/1964  Nomoto et al. ............... 195/66 R X
3,331,751  7/1967  Reusser ................................. 195/62
3,657,416  4/1972  Reid et al. .......................... 195/62 X FOREIGN PATENTS OR APPLICATIONS
7,646  2/1970  France

OTHER PUBLICATIONS

Trop et al., The Specificity of Proteinases from Streptomyces griseus (Pronase), Biochem. J. 1970, Vol. 11e (pp. 19–25), QP501.B47.

*Primary Examiner*—David M. Naff
*Attorney, Agent, or Firm*—Stevens, Davis, Miller & Mosher

[57] ABSTRACT

A thrombolytic and fibrinolytic proteolytic enzyme is produced by aerobically culturing in an aqueous medium a newly discovered microorganism *Streptomcyes venetus* DS 24,288 (NRRL 3987) and isolating the enzyme after culturing.

10 Claims, 3 Drawing Figures

THROMBOLYTIC AND FIBRINOLYTIC ENZYME FROM STREPTOMYCES

This invention relates to a new enzyme, denoted hereinafter by the number 22,750 RP, to a process for its preparation and to pharmaceutical compositions containing it.

The new enzyme is of particular value as a thrombolytic agent and is characterised by a general proteolytic activity in vitro.

The enzyme 22, 750 RP is obtained by culture, in suitable media, of a microorganism of the Streptomyces genus, identified more completely hereinafter and denoted by the name *Streptomyces venetus*, DS 24, 288.

A specimen of the strain has been deposited with the United States Department of Agriculture, Northern Regional Research Laboratory, at Peoria, Ill., U.S.A. and has been given the number NRRL 3987; a sample of the microorganism can be obtained from the aforementioned Research Laboratory.

The enzyme 22,750 RP according to the invention is characterised by the following physico-chemical properties:

It is very soluble in water, soluble in aqueous-alcoholic and aqueous-acetone mixtures, very slightly soluble in concentrated solutions of neutral salts [e.g. NaCl; $(NH_4)_2SO_4$] or of polyethylene glycol and insoluble in anhydrous alcohols, acetone, hexane, ethyl acetate, diethyl ether and chlorinated solvents.

It is a protein which gives the conventional reactions of proteins (biuret reaction, Folin reaction and staining with Ponceau Red, Amide Black 12 BN or Coomassie Blue).

The enzyme contains carbon, hydrogen, oxygen, nitrogen and sulphur, the relative proportions being approximately:

C = 50.4% H = 7.35% N = 17% S = 0.50%

According to its chromatographic behaviour on a dextran gel or on a polyacrylamide gel, 22, 750 RP has a molecular weight of 40,000 ± 5,000.

Acid hydrolysis of the enzyme 22,750 RP demonstrates the presence of the following amino-acids, for which the content in millimol per 10 g. of product is given: aspartic acid (11.5), threonine (8.5), serine (7), glutamic acid (3.5), proline (2.5), glycine (13), alanine (7), valine (4.5), methionine (1), isoleucine (2.5), leucine (4), tyrosine (5), phenylalanine (2), lysine (3), arginine (2.5) and histidine (2).

The enzyme 22,750 RP is characterised by the physical properties given below:

Appearance: white powder (after lyophilisation)
Ultra-violet spectrum: (determined with a 0.03% strength solution in water)

Absorption at 210 nm    $E_{1\ cm}^{1\%} = 187$
Absorption minimum at 250 nm    $E_{1\ cm}^{1\%} = 4.35$
Absorption maximum at 278 nm    $E_{1\ cm}^{1\%} = 13.55$ Infra-red spectrum: (determined with tablets of a mixture with KBr)

Figure 1:
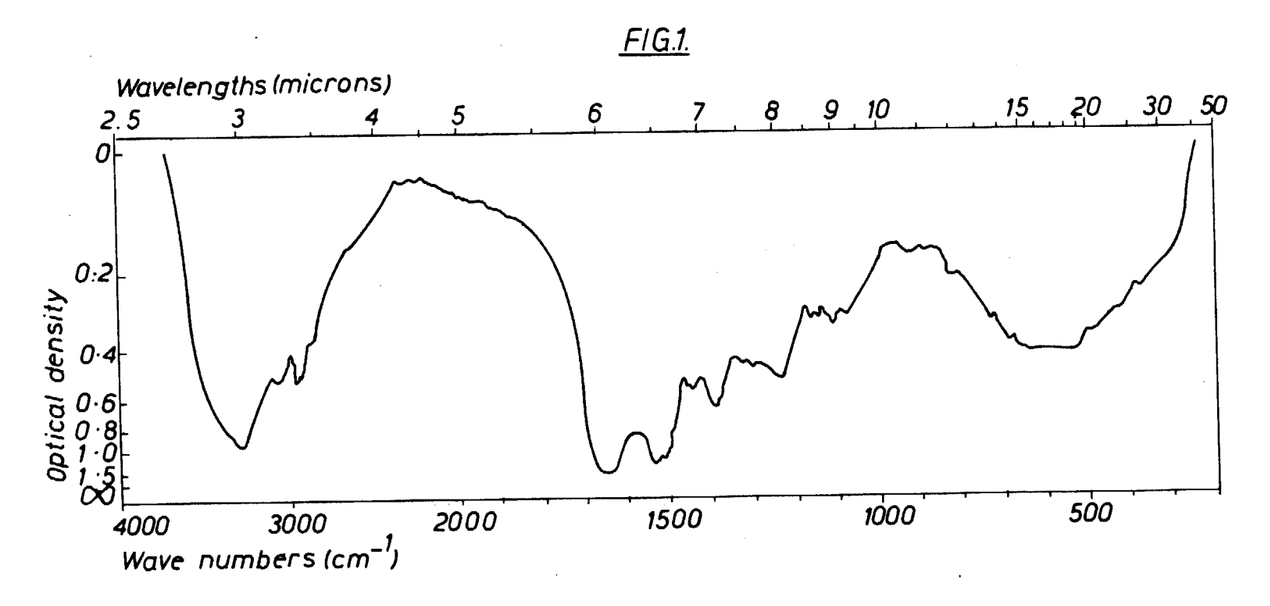

This spectrum is shown in FIG. 1 of the accompanying drawings, in which the abscissae give the wavelengths expressed in microns (upper scale) and the wave numbers in $cm^{-1}$ (lower scale) and the ordinate gives the optical density.

The principal infra-red absorption bands of 22,750 RP, expressed as wave numbers ($cm^{-1}$), are given in Table I which follows:

TABLE I

| | | | |
|---|---|---|---|
| 3,280 vS | 1,515 m | 1,365 sh. | 1,040 vw |
| 3,200 sh. | 1,490 sh. | 1,330 vw | 927 vw |
| 3,060 m | 1,465 vw | 1,303 w | 920 vw |
| 3,040 vw | 1,455 vw | 1,280 sh. | 825 vw |
| 2,980 sh. | 1,445 m | 1,235 m | 735 vw |
| 2,960 m | 1,435 sh. | 1,165 w | 695 w |
| 2,935 w | 1,418 sh. | 1,145 vw | about 600 m and wide |
| 2,880 sh. | 1,405 w | 1,110 m | 530 w |
| 2,650 sh. | 1,398 sh. | 1,075 m | 470 sh. |
| 1,650 vS | 1,385 m | 1,055 vw | 430 w |
| 1,535 vS | 1,375 sh. | | | vw = very weak
w = weak
m = medium
vS = very strong
sh. = shoulder

Optical rotation:(determined with a 0.5% strength solution in water)

$$[\alpha]_D^{20} = -14 \pm 0.5°$$
$$[\alpha]_{436}^{20} = -29.2 \pm 0.6°$$
$$[\alpha]_{365}^{20} = -53.5 \pm 0.8°$$

The enzyme 22,750 RP can be characterised by its electrophoretic behaviour on a cellulose acetate gel ("Cellogel" N.D. Chemetron), using different buffers, for example as follows:

| | | |
|---|---|---|
| Citric acid/disodium phosphate | pH = 2.2 | *µ = 0.09 |
| Acetic acid/sodium acetate | pH = 4.0 | µ = 0.1 |
| 5,5-Diethyl-barbituric acid (barbital) | pH = 8.6 | µ = 0.075 |
| Sodium hydroxide/glycine | pH = 9.6 | µ = 0.1 |

*µ = ionic strength

The enzyme can be detected by colourimetric methods or by measurement of proteolytic activity.

For example, at pH = 4.0, the active factor migrates towards the cathode at a rate of 5 mm/2 hours under a constant potential of 250 volts (intensity varying from 6 to 15 milliamperes).

The enzymatic activity of 22,750 RP is manifested on a large number of proteinaceous substrates, and in particular on casein, haemoglobin and fibrin. It is manifested only very weakly on the ethyl ester of benzoylarginine (BAEE) and is not manifested at all on the ethyl ester of acetyltyrosine (ATEE).

The activity on casein is determined according to a technique suggested by that of Kunitz, developed for the determination of trypsin [M. Kunitz, J. Gen. Physiol., 30, 291, (1947)]. The peptides set free during the hydrolysis, which are soluble in trichloroacetic acid, are determined by spectrophotometry (measurement of the optical density at 280 nm). The enzymatic activity can be expressed in Kunitz units (K.U.): according to the definition of Kunitz, one unit is the amount of enzyme which sets free sufficient soluble peptides for the optical density at 280 nm of trichloroacetic acid filtrate to increase by 1.000 in one minute.

The results which have been obtained with the enzyme 22,750 RP compared with two crystalline proteolytic enzyme, namely trypsin and chymotrypsin, are given in Table II.

TABLE II

| Reaction | Substrate | | Activity KU/g. | | |
|---|---|---|---|---|---|
| | | | 22,750 RP | Trypsin | Chymo-trypsin |
| Proteolysis | casein | (a) | 11,000 | 4,000 | 4,800 |
| | azo-casein | (b) | 28,800 | 13,300 | 3,250 |
| | gelatine | (c) | 800 | 4,000 | 100 |
| Fibrinolysis | clot of bovine fibrin | (d) | 6,780 | 29,000 | 4,000 |
| | clot of rabbit plasma | (e) | 3,800 | 2,000 | 2,700 |
| | clot of dog plasma | (f) | 500,000 | 20,000 | 10,000 |
| | clot of human plasma | (g) | 200,000 | 10,000 | 4,000 |
| Esterolysis | B.A.E.E. | (h) | 17 | 34,000 | 300 |
| | A.T.E.E. | (i) | 0 | 2,000 | 116,000 |

Figure 2:
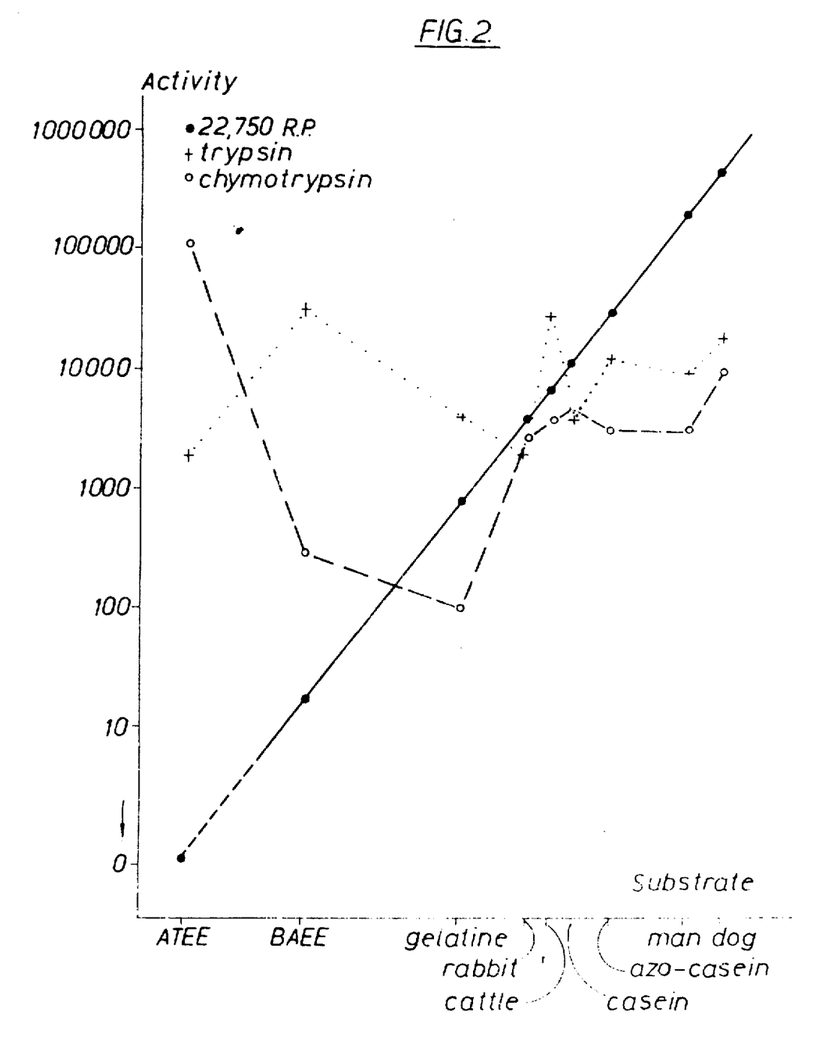

FIG. 2 gives these results in diagrammatic form. Reaction conditions are given below.

| | | | | |
|---|---|---|---|---|
| (a) | Reaction at pH | = 8.0 at 37°C. | - concentration of substrate | = 5 g./l |
| (b) | " | = 7.5 at 37°C. | - concentration of substrate | = 12.5 g./l |
| (c) | " | = 7.5 at 37°C. | - on a gelatine film | |
| (d) | " | = 7.4 at 37°C. | - concentration of fibrinogen: | 10 g./l |
| (e) | " | = 7.5 at 37°C. | - concentration of plasma: | 400 cc/l |
| (f) | " | = 7.4 at 37°C. | - concentration of plasma: | 200 cc/l |
| (g) | " | = 7.4 at 37°C. | - concentration of plasma: | 200 cc/l |
| (h) | " | = 7.7 at 25°C. | - concentration of substrate: | $5 \times 10^{-4}$ M |
| (i) | " | = 7.0 at 25°C. | - concentration of substrate: | $5 \times 10^{-4}$ M |

The thrombolytic and fibrinolytic activity of 22,750 RP has been confirmed on laboratory animals.

In the rabbit, at a dose of 0.5 mg/kg. animal body weight, administered intravenously, the enzyme provides protection to a highly significant extent, against intravascular coagulation induced by passing a nylon thread impregnated with collagen into the jugular vein [technique suggested by that of J. L. David et coll, C.R. Soc. Biol., 162, 1763 (1968)]. Acceleration of fibrinolysis can be demonstrated, in rabbits, from a dose of 0.05 mg/kg., administered intravenously.

The toxicity of the enzyme 22,750 RP has been studied in several animal species. In mice, the 50% lethal dose ($LD_{50}$), determined by intravenous administration, is 5 mg/kg. animal body weight; it is the same after repeated administration over the course of 5 days as after a single administration. In rabbits, the $LD_{50}$, determined by intravenous administration, is 1.5 mg/kg. animal body weight.

These properties make it possible to use the product according to the invention in human therapy in the prevention and the treatment of venous thromboses, pulmonary embolisms and thromboses of the coronary arteries, the arteries supplying the extremities and the cerebral arteries.

The organism which produces the enzyme 22,750 RP, viz. Streptomyces venetus, DS 24,288 (NRRL 3,987), has been isolated from a sample of earth taken in India.

The isolation of Streptomyces venetus, DS 24,288 was carried out by following the general method which consists of suspending a small amount of earth in sterile distilled water, diluting the suspension to different concentrations and spreading a small volume of each dilution on the surface of Petri dishes containing a nutrient agar medium. After incubation for several days at 26°C., which allows the microorganism to develop, the colonies which it is desired to isolate in order to continue their investigation are removed and transplanted onto nutrient agar slopes in order to produce more abundant cultures.

Streptomyces venetus DS 24,288 forms oval spores, measuring 0.4 to 0.6 $\mu$/l to 1.2 $\mu$. Its sporophores comprise spiral sporiferous filaments, the coil of which most frequently possesses five to eight turns, but can sometimes contain a few more; the latter are quite often inserted singly on the filaments which support them, but it is also possible to observe sporophores in clusters of a few elements. According to its method of sporulation, this strain is classified in the Spira section of the Pridham classification.

Streptomyces venetus DS 24,288 develops well at 25°C. and at 37°C., but not at 50°C. It possesses the property of producing black melanin pigment on a suitable medium containing tyrosine, produces $H_2S$, strongly reduces nitrates to nitrites, hydrolyses starch, liquefies gelatine, peptonises milk without first coagulating it and utilises cellulose. The colouration of its vegetative mycelium ranges, depending on the media, from yellow to brown-yellow, yellow-brown or dark brown; the soluble pigments which it produces are generally of a darker or lighter yellow-brown tone depending on the media, and they can, in certain cases, be blackish-brown. Its aerial mycelium is coloured blue when sporulation occurs.

The cultural characteristics and the biochemical properties of Streptomyces venetus DS 24,288 are given in Table III which follows. Unless otherwise stated they are those of cultures which have reached a good stage of development, that is to say, about 3 weeks at 25°C. These characteristics have been observed on nutrient agars and broths usually employed to determine the morphological characteristics of Streptomyces strains, the cultures on agar media being carried out on agar slopes. A certain number of the culture media used were prepared in accordance with the formulations indicated in "Actinomycetes," S. A. Waksman, p. 193-197, Chronica Botanica Company, Waltham, Mass., U.S.A., 1950; in this case, they are indicated by the letter W followed by the number given them in "The Actinomycetes." The references or compositions of the other culture media are as follows:

Ref.A — "Hickey and Tresner's Agar" — T. G. Pridham et coll — Antibiotics Annual, 1956–1957, p. 950

Ref.B — K. L. Jones — Journal of Bacteriology, 57, 142, 1949

Ref.C — Formulation W-23, to which 2% of agar has been added.

Ref.D — "Yeast Extract Agar" — T. G. Pridham et coll — Antibiotics Annual, 1956–1957, p. 950

Ref.E — "Tomato Paste Oatmeal Agar" — T. G. Pridham et coll - Antibiotics Annual, 1956–1957, p. 950

Ref.F — "Melanin formation medium" — The Actinomycetes, vol. 2, p. 333, No. 42 — S. A. Waksman — The Williams and Wilkins Company, Baltimore, 1961

Ref.G — W. E. Grundy et coll — Antibiotics and Chem. 2, 401, 1952

Ref.H — "Inorganic Salts — Starch Agar" — T. G. Pridham et coll — Antibiotics Annual, 1956–1957, p. 951

Ref.I — "Substrat 1 mit mineralischer Stickstoffquelle," p. 14 — G. F. Gause et coll, ZUR KLASSIFIZIERUNG DER ACTINOMYCETEN - VEB GUSTAV FISCHER VERLAG. JENA-1958

Ref.J — corresponds to the formulation W-1, with 30 g. of sucrose replaced by 15 g. of glucose Ref.K — corresponds to the formulation W-1, with 30 g. of sucrose replaced by 15 g. of glycerine Ref.L — corresponds to the formulation W-18, with 30 g. of sucrose replaced by 15 g. of glucose Ref.M — corresponds to the formulation W-18, with the sucrose removed and replaced by small strips of filter paper partially immersed in the liquid Ref.N — "Manual of Methods for Pure Culture Study of Bacetria" — of the Society of American Bacteriologists — Geneva, N.Y., II$_{50}$-18

Ref.P — "Plain gelatin" — prepared in accordance with the instructions of "Manual of Methods for Pure Culture Study of Bacteria" — of the Society of American Bacteriologists — Geneva, N.Y. II$_{50}$-18

Ref.Q — Commerically available skimmed milk powder, reconstituted in accordance with the manufacturer's instructions.

Ref.R — Medium indicated for the research of the production of $H_2S$ by H. D. Tresner and F. Danga — Journal of Bacteriology, 76, 239–244, 1958.

TABLE III

| Culture medium | Degree of development | Vegetative mycelium (V.m.) or Underside of the culture | Aerial structure (comprising the serial mycelium and sporulation combination) | Soluble pigment | Observations and biochemical properties |
|---|---|---|---|---|---|
| Hickey and Tresner agar (Ref. A) | Very good | Underside blackish-brown | Light greyish-blue. Well developed. | Dark brown, ranging towards blackish-brown | Oval spores measuring 0.4 to 0.6/1 to 1.2 μ. Spiral sporophores, unbranched or in short clusters |
| Bennett agar (Ref. B) | Good | Underside yellow-brown | Whitish to light blue | Yellow-brown | |
| Emerson agar (Ref. C) | Good | V.m. thick and wrinkled, yellow-brown | Whitish. In trace amounts | Yellow-brown | |
| Pridham yeast extract agar (Ref. D) | Good | V.m. thick and wrinkled, yellow-brown | Whitish to light blue | Orange-brown | |
| Pridham oatmeal and tomato extract agar (Ref. E) | Good | V.m. thick and wrinkled, yellow-brown | Whitish to light blue | Yellow-brown | |
| Glucose-peptone agar (W.6) | Quite good | V.m. thick and wrinkled, yellow-brown | Greyish-white. Very poorly developed | Yellow-brown | |
| Nutrient agar (W-5) | Average | V.m. yellow-brown | None | Yellow-brown | |
| Tyrosine-yeast extract agar for the formation of melanin (Ref. F) | Moderate | Underside blackish-brown | Blue-grey | Black | Formation of melanin: positive (readings carried out in accordance with the recommendations of the author) |
| Krainsky calcium malate agar (Ref. G) | Moderate | V.m. lemon yellow | Whitish. In trace amounts | None | Solubilisation of the malate: positive, good |
| Ovalbumin agar (W-12) | Poor | V.m. colourless to brownish, poorly developed | Whitish. In trace amounts | Brownish-yellow weak | |
| Glucose-asparagine agar (W-2) | Quite good | V.m. thick and wrinkled, brown-yellow to yellow-brown | Whitish to bluish. Rather poorly developed | yellow-brown | |
| Glycerine-asparagine agar (W-3) | Quite good | V.m. thick, yellow-brown | Whitish to bluish. Very poorly developed | Yellow-brown | |
| Pridham starch-inorganic salts agar (Ref. H) | Quite good | Underside yellow-brown | Light greyish blue | None | Oval spores measuring 0.4 to 0.6/1 to 1.2 μ. Spiral sporophores, unbranched or in short clusters. Hydrolysis of the starch: positive |
| Starch-nitrate agar (W-10) | Moderate | Underside yellow-brown | Whitish to light blue | Yellow-brown | Hydrolysis of the starch: positive |
| Gause starch-inorganic nitrogen agar (Ref. I) | Good | V.m. thick and wrinkled, yellow-brown | Light greyish blue | Dark yellow-brown, ranging towards blackish | |
| Czapek sucrose synthetic agar (W-1) | Good | V.m. thick and wrinkled, yellow-brown | Whitish. Very poorly developed | Yellow-brown | |

TABLE III — Continued

| Culture medium | Degree of development | Vegetative mycelium (V.m.) or Underside of the culture | Aerial structure (comprising the aerial mycelium and sporulation combination) | Soluble pigment | Observations and biochemical properties |
|---|---|---|---|---|---|
| Czapek glucose synthetic agar (Ref. J) | Good | V.m. thick and wrinkled, brown-yellow | Whitish. In trace amounts | Light yellow-brown | |
| Czapek glycerine synthetic agar (Ref. K) | Average | V.m. light brownish-yellow | None | Light brownish-yellow | |
| Starch-nitrate broth (W-19) | Good | Thick velum. Underside brown-yellow to yellow-brown | White | Brownish-yellow | Production of nitrites: strongly positive |
| Czapek sucrose broth (W-18) | Moderate | Yellowish-white velum | None | None or slow, weak yellow | Production of nitrites: strongly positive |
| Czapek glucose broth (Ref. L) | Moderate | Yellowish-white velum | None | None or slow, weak yellow | Production of nitrites: strongly positive |
| Czapek cellulose broth (Ref. M) | Moderate | Whitish velum. Moderately developed. | Light greyish-blue. Moderately developed on the velum and on the paper emerging from the broth | None | Production of nitrites: strongly positive Use of the cellulose: positive |
| Nitrate nutrient broth (Ref. N) | Good | Well developed ring yellowish | Whitish. In trace amounts | Brownish | Production of nitrites: strongly positive |
| Potato culture (W-27) | Good | V.m. very thick and very wrinkled, dark yellow-brown | Whitish. In trace amounts | Black | |
| 12% strength pure gelatine (Ref. P) | Good | Thick central colony at the surface. V.m. brown-yellow | Whitish. Poorly developed. | Brown-yellow to yellow-brown | Rapid liquefaction of the gelatine |
| Skimmed milk 1) at 25°C. (Ref. Q) | Good | Light yellow-brown ring | None | | Peptonisation without coagulation. pH going from 6.2 to 6.6 in 1 month |
| 2) at 37°C. | Good | Dark brown ring | None | | Peptonisation without coagulation. pH going from 6.2 to 6.8 in 1 month |
| Tresner and Danga agar (Ref. R) | Good | V.m blackish-brown | None | Black, abundant | Production of H₂S: positive (readings carried out in accordance with the recommendations of the authors). |

*Streptomyces venetus* DS 24,288 possesses a combination of properties which do not coincide exactly with any of those of the strains of Streptomyces previously described.

Considering the species described by S. A. Waksman in "The Actinomycetes" (volume 2, The Williams and Wilkins Company, Baltimore, 1961), *S. venetus* Ds 24,288 would be placed in the "Viridochromogenes Series" described on page 149 of this work, in view of its production of melanin pigment, its blue sporulated aerial mycelium and light brown to dark brown vegetative mycelium, formation of soluble pigments ranging from brown-yellow to yellow-brown or very dark brown, depending on the particular case, on synthetic or organic media, and its spiral sporophores. However, it cannot be likened to any of the three species mentioned by S. A. Waksman as forming this series, namely *Streptomyces viridochromogenes*, *Streptomyces chartreusis* and *Streptomyces cyaneus*.

It cannot be identified with *S. cyaneus* which, unlike *S. venetus*, forms a blue-coloured vegetative mycelium on agar media; furthermore, unlike *S. venetus* Ds 24,288, *S. cyaneus* does not use cellulose and does not reduce nitrates to nitrites.

It cannot be likened to *S. chartreusis* which gives a green-yellow to black soluble pigment on gelatine and does not give a soluble pigment on nutrient agar or on potato, whilst *S. venetus* DS 24,288 gives a yellow-brown soluble pigment on gelatine as well as on nutrient agar and a black soluble pigment on potato.

Finally, it differs essentially from *S. viridochromogenes* in that the latter forms vegetative mycelium, possessing a very dark green shade which can even approach blackish-green, in a characteristic manner, on a number of media (in particular, on sucrose nitrated synthetic agar, on gelatine and on nutrient agar); *S. venetus* DS 24,288 forms a vegetative mycelium which remains, in every case, within a range of shades going from brown-yellow to yellow-brown and is never shaded green, nor does it ever produce a dark green soluble pigment. Furthermore, *S. viridochromogenes* does not reduce nitrates to nitrites, whilst *S. venetus* DS 24,288 does so in a particularly strong and rapid manner, both on synthetic media and on organic media.

S. A. Waksman also includes a number of strains described by Gause *et coll* (zur Klassifizierung der Actinomyceten, G. Fischer, Jena 1958) in the "Viridochromogenes group": when comparing *s. venetus* DS 24,288 with this group, which forms the largest part of the "Coerulescens Series" of Gause, it would be situated in the latter group which comprises the strains of which the vegetative mycelium on starch-inorganic nitrogen agar of Gause is of a dark colour and which contains only two species, namely *Actinomyces (Streptomyces) viridochromogenes* and *Actinomyces (Streptomyces) coeruleofuscus*.

*S. venetus* DS 24,288 differs from the species *S. viridochromogenes* essentially in the dark green colouration which the vegetative mycelium of the latter can assume on a number of media, which S. A. Waksman has mentioned in his description. In addition in the description given by Gause *et coll*, *S. viridochromogenes* also produces a vegetative mycelim which assumes a dark green shade on milk, on starch agar, on potato and on the starch-inorganic nitrogen agar of Gause and does not produce any soluble pigment on the latter medium; in comparison, *S. venetus* DS 24,288 does not give a dark green vegetative mycelium on these media and produces a dark yellow-brown soluble pigment on the starch-inorganic nitrogen agar of Gause. The formation of a dark green soluble pigment on gelatine by *S. viridochromogenes*, mentioned by Gause, does not occur in the case of *S. venetus* DS 24,288.

*S. venetus* DS 24,288 cannot be identified with *S. coeruleofuscus* which, in contrast to it, does not reduce nitrates and does not use cellulose; furthermore, *s. coeruleofuscus* does not give a soluble pigment on an organic agar medium or on potato, whilst *S. venetus* DS 24,288 consistently gives a yellow-brown soluble pigment on all the organic media tested, and a black soluble pigment on potato.

The ability of *S. venetus* DS 24,288 to use various sources of carbon and nitrogen to ensure its development was determined according to the principle of the Pridham and Gottlieb method (J. of Bact., 56 107–114, (1948). The degree of development was observed on the base medium indicated by the authors, either replacing the glucose by the various sources of carbon tested respectively, or $(NH_4)_2SO_4$ by the various sources of nitrogen tested respectively. The results are given in Table IV.

TABLE IV

| Sources of carbon tested | Use | Sources of nitrogen tested | Use |
|---|---|---|---|
| D-Ribose | Positive | $NaNO_3$ | Positive |
| D-Xylose | Positive | $NaNO_2$ | Positive |
| L-Arabinose | Positive | $(NH_4)_2SO_4$ | Positive |
| L-Rhamnose | Positive | $(NH_4)_2HPO_4$ | Positive |
| D-Glucose | Positive | Adenine | Positive |
| D-Galactose | Positive | Adenosine | Positive |
| D-Fructose | Positive | Urea | Positive |
| D-Mannose | Positive | L-Asparagine | Positive |
| L-Sorbose | Negative | Glycine | Positive |
| Lactose | Positive | Sarcosine | Negative |
| Maltose | Positive | DL-Alanine | Positive |
| Sucrose | Positive | DL-Valine | Positive |
| Trehalose | Positive | DL-Aspartic acid | Positive |
| Cellobiose | Positive | L-Glutamic acid | Positive |
| Raffinose | Positive | L-Arginine | Positive |
| Dextrin | Positive | L-Lysine | Positive |
| Inulin | Negative | DL-Serine | Positive |
| Starch | Positive | DL-Threonine | Positive |
| Glycogen | Positive | Taurine | Negative |
| Glycerol | Positive | DL-Phenylalanine | Positive |
| Erythritol | Negative | L-Tyrosine | Positive |
| Adonitol | Positive | DL-Proline | Positive |
| Dulcitol | Negative | L-Hydroxyproline | Positive |
| D-Mannitol | Positive | L-Histidine | Positive |
| D-Sorbitol | Negative | L-Tryptophane | Positive |
| Inositol | Positive | Betain | Positive |
| Salicine | Positive but slow | | |

According to a feature of the invention, the enzyme 22,750 RP is produced by aerobically cultivating *Streptomyces venetus* DS 24,288 (NRRL 3987), or a mutant thereof capable of producing the enzyme, using an aqueous medium containing assimilable sources of carbon, nitrogen and inorganic substances and isolating from the medium 22,750 RP formed during the culture.

The culture of *Streptomyces venetus* DS 24,288 can be carried out by any of the known aerobic surface or submerged culture methods, the latter being preferred because they are more convenient. Conventional types of apparatus currently employed in the fermentation industry may be used. In particular, the following sequence of operations may be adopted:

The fermentation medium must contain a source of assimilable carbon and a source of assimilable nitrogen and inorganic substances and, optionally, growth-promoting factors and thickners; all these ingredients may be supplied as well-defined products or complex mixtures, such as those found in biological products of various origins.

As sources of assimilable carbon, there may be used carbohydrates such as glucose, sucrose, lactose, dextrins, starch, molasses or other carbon-, hydrogen- and oxygen-containing substances such as sugar alcohols, e.g. glycerol or mannitol, or certain organic acids e.g. lactic acid, citric acid and tartaric acid. Certain animal or vegetable oils such as lard oil or soya bean oil may be advantageously used instead of, or in admixture with the aformentioned substances.

The suitable sources of assimilable nitrogen are extremely varied. They may be very simple chemical compounds such as nitrates, inorganic or organic ammonium salts, urea and certain amino acids. They may also be complex substances, containing principally nitrogen in a protein form, e.g. casein, lactalbumin, gluten and their hydrolysates, soya bean flour, peanut meal, fish meal, meat extract, yeast extract, distiller's solubles and corn-steep liquor.

Amongst the inorganic substances added, some may have a buffering or neutralisng effect, such as the alkali metal or alkaline earth metal phosphates, or the carbonates of calcium or magnesium. Others contribute to the ionic equilibrium necessary for the development of *Streptomyces venetus* DS 24,288 and for the production of the enzyme 22,750 RP; examples of these are the chlorides and sulphates of the alkali metals and alkaline earth metals. Finally, some of them act more especially as activators of the metabolism of *Streptomyces venetus* DS 24,288: to these belong the salts of iron and cobalt.

Amongst the thickeners, the most usually employed are starch, carboxymethylcellulose and agar.

The pH of the fermentation medium at the start of the culture should be between 6.0 and 7.8, and preferably between 6.4 and 7.5. The optimum fermentation temperature is 25°–28°C., but satisfactory production is achieved at temperatures between 23° and 40°C. The rate of aeration of the fermentation broth can vary within quite wide limits, but it has been found that aeration rates of 0.3 to 2 litres of air per litre of broth per minute are particularly suitable. The maximum yield of the enzyme 22,750 RP is obtained after 1 to 7 days culture, but this period depends predominantly on the medium used.

The enzyme 22,750 RP can be extracted from the fermentation broth and purified by the usual methods for isolating and fractionating protein materials, the activity and the purity of the product being measured by suitable methods such as the determination of the activity on casein and the electrophoresis.

The enxyme 22,750 RP can be isolated from the fermentation broths by filtering the broth in the presence of a filtration aid, concentrating the filtrate under reduced pressure, acidifying the filtrate to a pH of about 4, filtering and then dialysing the filtrate against a stream of distilled water and then precipitating the enzyme 22,750 RP by adding acetone to the dialysate.

The enzyme 22,750 RP thus obtained can then be purified by the usual physico-chemical methods. The preferred method of purification used consists of dissolving the enzyme in distilled water and then precipitating the enzyme by adding agents, such as neutral salts, e.g. sodium chloride or ammonium sulphate, in concentrated aqueous solutions of which the enzyme is very sparingly soluble.

The enzyme 22,750 RP can also be purified by chromatography on various supports such as alumina, cellulose powder and dextran or polyacrylamide gels, by dialysis or by preparative electrophoresis.

The following Examples illustrate the invention.

EXAMPLE 1

A — Fermentation

A 170 litre fermenter is charged with:

| | |
|---|---|
| peptone | 600 g. |
| meat extract | 600 g. |
| hydrated glucose | 1,200 g. |
| soya bean oil | 120 cc. |
| sodium chloride | 600 g. |
| tap water, sufficient to make up to | 110 litres |

The pH is adjusted to 7.50 by adding 10N sodium hydroxide solution (120 cc.). The medium is sterilised by bubbling steam at 122°C. through it for 40 minutes. After cooling, the volume of the broth is 120 litres due to condensation of the steam during the sterilisation and the pH is 7.0. The medium is inoculated with a culture of *Streptomyces venetus* DS 24,288 (200 cc.), produced in an agitated Erlenmeyer flask. The culture is developed at 26°C. for 28 hours with agitation and aeration with sterilised air; it is then suitable for inoculation of the production culture.

The production culture is carried out in an 800 litre fermenter charged with the following substances:

| | |
|---|---|
| corn steep liquor (50% solids content) | 8 kg. |
| soya bean oil | 6 litres |
| ammonium sulphate | 0.8 kg. |
| cobalt chloride hexahydrate | 0.008 kg. |
| tap water, sufficient to make up to | 360 litres |

The pH is adjusted to 6.40 by adding 10N sodium hydroxide solution (450 cc.), calcium carbonate (2 kg.) is added, and then the medium is sterilised by bubbling steam at 122°C. through it for 40 minutes. After cooling, the volume of the broth is 390 litres due to condensation of the steam during the sterilisation. It is made up to 400 litres by adding a sterile aqueous solution (10 litres) containing hydrated glucose (4 kg.). The pH is then 6.60. It is inoculated with the inoculum culture (40 litres) from the 170 litre fermenter described above. The production culture is carried out at 26°C., for 116 hours, with agitation using a stirrer rotating at 260 revolutions/minute and aeration with a volume of sterilised air of 35 cu.m./hr. The final pH of the medium is 6.80 and the volume of the broth is 380 litres. The proteolytic strength of the broth is 0.4 K.U./cc.

B — Extraction

The fermentation broth (360 litres) obtained as described above and having a strength of 0.4 K.U./cc. is placed in a vat equipped with a stirrer. A filtration aid (18 kg.) is added to it and the mixture is filtered on a filter press and the filter cake is washed with water (100 litres). A filtrate (400 litres), of proteolytic strength 0.35 K.U./cc., is thus obtained.

The filtrate is concentrated under reduced pressure at a temperature of 35°C. A concentrate (30 litres), of strength 3.77 K.U./cc., is obtained. The pH of the concentrate is adjusted to 4.0 by adding 6N hydrochloric acid (450 cc.) and then a filtration aid (300 g.) is added. The mixture is filtered and the filter cake is washed with water (2 litres). The clarified concentrate is cooled to 4°C. and dialysed through a membrane of regenerated cellulose for 7 hours against a stream of distilled water at the same temperature.

Acetone (111 litres), previously cooled to −10°C., is added, with stirring, to the dialysate obtained (37 litres), kept at 4°C., and stirring is continued for 10 to 15 minutes after the end of the addition of the acetone.

The active precipitate produced is collected by filtration, washed with cold acetone and dried under reduced pressure (20 mm. Hg) for 24 hours at a temperature of about 30°C.

A product (997 g.), of strength 97 K.U./g., is thus obtained.

C — Purification - stage 1

Crude product (1,915 g.), prepared as described above, of strength 97 K.U./g. is dissolved in distilled water (40 litres).

Crystalline ammonium sulphate (9.6 kg.) (amount calculated to obtain a solution containing 38% of that required for a saturated salt solution) is added slowly, with stirring, to the solution thus prepared. Stirring is continued for 20 minutes after the end of the addition of the salt and then the mixture is centrifuged at 1,800 G. The precipitate obtained is removed.

Crystalline ammonium sulphate (5 kg.) (amount calculated to obtain a solution containing 52% of that required for a saturated salt solution) is added slowly, with stirring, to the supernatant liquid. Stirring is continued for 15 minutes after the end of the addition of the salt, the mixture is left to stand for 1 hour and then centrifuged at 1,800 G.

The active precipitate obtained is collected and taken up in distilled water (1 litre) and the solution obtained is dialysed through a membrane of regenerated cellulose for 24 hours at 4°C. against distilled water (40 litres).

The dialysate is lyophilised; a product (70 g.), of strength 1,200 K.U./g., is obtained. According to electrophoretic analysis, this product contains about 13% of active factor.

D — Purification — stage 2

The product (102 g.) prepared as described above and of strength 1,200 K.U./g. is dissolved in distilled water (4,100 cc.) and the pH of the solution is adjusted to 8.0 by adding N sodium hydroxide solution (66 cc.).

Polyethylene glycol 1,500 (1.25 kg.) is added slowly, with stirring, to the solution thus obtained. Stirring is continued for 15 minutes after the end of the addition of the precipitating agent. The mixture is left to stand for 15 minutes and then centrifuged for 15 minutes at 12,000 G at 4°C.

The active precipitate obtained is dissolved in distilled water (700 cc.) and the solution produced (800 cc.) is cooled to 4°C. Isopropanol (4 litres), cooled to −60°C., is slowly added to it, with stirring.

The active precipitate produced is collected by centrifuging for 15 minutes at 3,000 G at −10°C. and is then dried under reduced pressure (0.2 mm. Hg) in the presence of $P_2O_5$ at a temperature of about 20°C.

A product (30.7 g.), of strength 1,600 K.U./g. and containing, according to electrophoretic analysis, approximately 20% of active factor, is thus obtained.

E — PUrification — stage 3

The product (10 g.) prepared as described above and of strength 1,600 K.U./g. is dissolved in distilled water (400 cc.) and the pH of the solution is adjusted to 8.0 by adding N sodium hydroxide solution (3 cc.).

A 6% strength aqueous solution of 6,9-diamino-2-ethoxy-acridine lactate (26.6 cc.) is added slowly, with stirring, to the solution thus obtained. After 15 minutes of additional stirring followed by 1 hour's standing at 40°C., the mixture is centrifuged for 10 minutes at 12,000 G at 4°C.

The inactive precipitate obtained is removed. The supernatant solution is concentrated under reduced pressure (0.2 mm. Hg) at 25°C. to a volume of 25 cc. It is then cooled to 4°C. and isopropanol (250 cc.), cooled to −60°C., is slowly added to it, with stirring.

The active precipitate produced is collected by centrifuging for 15 minutes at 12,000 G at −10°C. and then dried under reduced pressure (0.2 mm. Hg) in the presence of $P_2O_5$ at a temperature of about 20°C.

A product (4.7 g.), of strength 2,240 K.U./g. and containing, according to electrophoretic analysis, about 37% of active factor, is thus obtained.

F — Purification — stage 4

The product (200 mg.), prepared as described above and of strength 2,240 K.U./g., is dissolved in a 0.01 M phosphate buffer (3 cc.) at pH 6.5 and isopropanol (3 cc.) and cellulose powder (4 g.) for chromatography are added.

The paste thus obtained is placed in an even thickness at the top of a cellulose column. The column is 3 cm. in diameter and contains cellulose (80 g.) in a volume for volume mixture of isopropanol and 0.01 M phosphate buffer of pH = 6.5 (which represents a height of 39 cm.). It is eluted with a phosphate buffer/isopropanol mixture, increasing the proportion of buffer in the mixture, in a linear manner, from 50 to 100% by volume (total volume of eluent with a composition gradient: 1.5 l.); the flow rate is 35 cc./hour. The eluate is collected in fractions of approximately 20 cc. and its optical density is measured continuously by a "UVICORD L.K.B." analyser at 280 nm. A suitable plot of the results obtained shows a first very asymmetric peak and then, well separated, a second symmetric peak corresponding to a buffer concentration of between 78 and 92%. Electrophoretic analysis shows that only the second peak contains the active factor.

The fractions corresponding to the second peak (fractions 53 to 70, total volume 415 cc.) are combined, the alcohol is removed by evaporation under reduced pressure (2 mm. Hg) and then the solution is dialysed across a membrane of regenerated cellulose against distilled water (10 litres) for 24 hours at 4°C. and is then lyophilised.

A product (43 mg.) of strength 6,400 K.U./g. and containing, according to electrophoretic analysis, approximately 55% of active factor, is thus obtained.

EXAMPLE 2

The product (3 g.), of strength 1,600 K.U./g., prepared as described in Example 1A-D, is dissolved in a barbital buffer, pH = 8.6, $\mu$ =0.0375 (40 cc.) and this solution is dialysed through a membrane of regenerated cellulose for 48 hours against the same buffer (10 litres) at 4°C.

The solution is then clarified by centrifuging for 15 minutes at 12,000 G at 4°C. and then placed at the top of a L.K.B. column, of the PORATH type, containing cellulose (1.3 kg.) in barbital buffer, pH = 8.6, $\mu$ = 0.075 (which represents a height of 66 cm.), for preparative electrophoresis.

A potential of 500 volts (anode at the top) is then applied to the terminals of the apparatus; the current is about 0.46 A; the temperature inside the column is kept at about 20°C. by continuously circulating a cooling liquid at 4°C. in the double wall. From the first hour of the electrophoresis, coloured impurities migrate into the anode compartment. The coloured buffer is removed and is replaced by fresh buffer, repeating this operation as often as is necessary; the removal of these pigments is almost complete after 6 hours of electrophoresis. The potential is then reduced to 400 volts (current = 0.32 A) and a counter-current elution is started in the foot of the column, with a flow rate of 250 cc./hour; the eluate is collected in fractions of about 50 cc. and its optical density is measured continuously by a UVICORD L.K.B. analyser at 280 nm. After 15 hours under these conditions, the potential is increased again to 500 volts (current = 0.40 A) whilst bringing the counter-current elution flow rate to 125 cc./hour. After 10 hours, i.e. 31 hours after the start of the operation, the electrophoresis is stopped and direct elution is carried out from the top downwards with barbital buffer at a flow rate of 210 cc./hour.

A suitable plot of the results obtained shows a first small peak (about the 23rd hour of electrophoresis) followed by three imperfectly separated large peaks. Electrophoretic analysis shows that only the third peak contains the active factor. The fractions corresponding to the 3rd peak (total volume 1,425 cc.) are combined and concentrated to 400 cc. by evaporation under reduced pressure (2 mm. Hg) and then dialysed three times for 24 hours against distilled water at 4°C. (50 litres each time).

The dialysed solution is concentrated to 10 cc. by evaporation under reduced pressure (2 mm. Hg) and then cooled to 4°C. Isopropanol (100 cc.), cooled to −60°C., is added slowly to it, with stirring. The active precipitate produced is collected by centrifuging for 10 minutes at 12,000 G at −10°C. and then dried under reduced pressure (0.2 mm. Hg) in the presence of $P_2O_5$ at a temperature of about 20°C.

A product (276 mg.) of strength 7,000 K.U./g. and containing, according to electrophoretic analysis, approximately 65% of active factor is thus obtained. This product contains carbon, hydrogen, oxygen, nitrogen, phosphorus and sulphur. Its elementary composition is approximately:

C = 44.6%  H = 6.5%  N = 12.5%  P = 0.35%  S = 0.65%

Acid hydrolysis of the product shows the presence of the following amino acids for which the content, in millimol per 10 g. of product, is as follows: aspartic acid (8.5), threonine (7), serine (6.5), glutamic acid (5), proline (2), glycine (10.5), alanine (7.5), valine (5.5), isoleucine (2), leucine (3), tyrosine (3.5), phenylalanine (1), lysine (2), arginine (2) and histidine (1.5).

The product possesses the physical properties given below:

Appearance: beige powder (after lyophilisation)
Ultra-violet spectrum: (determination from a 0.02% strength solution in water)

| | |
|---|---|
| absorption at 210 nm | $E_{1\,cm}^{1\%} = 205$ |
| absorption minimum at 250 nm | $E_{1\,cm}^{1\%} = 7.8$ |
| absorption maximum at 278 nm | $E_{1\,cm}^{1\%} = 14.1$ |

Infra-red spectrum: (determination from tablets of a mixture with KBr)

Figure 3:
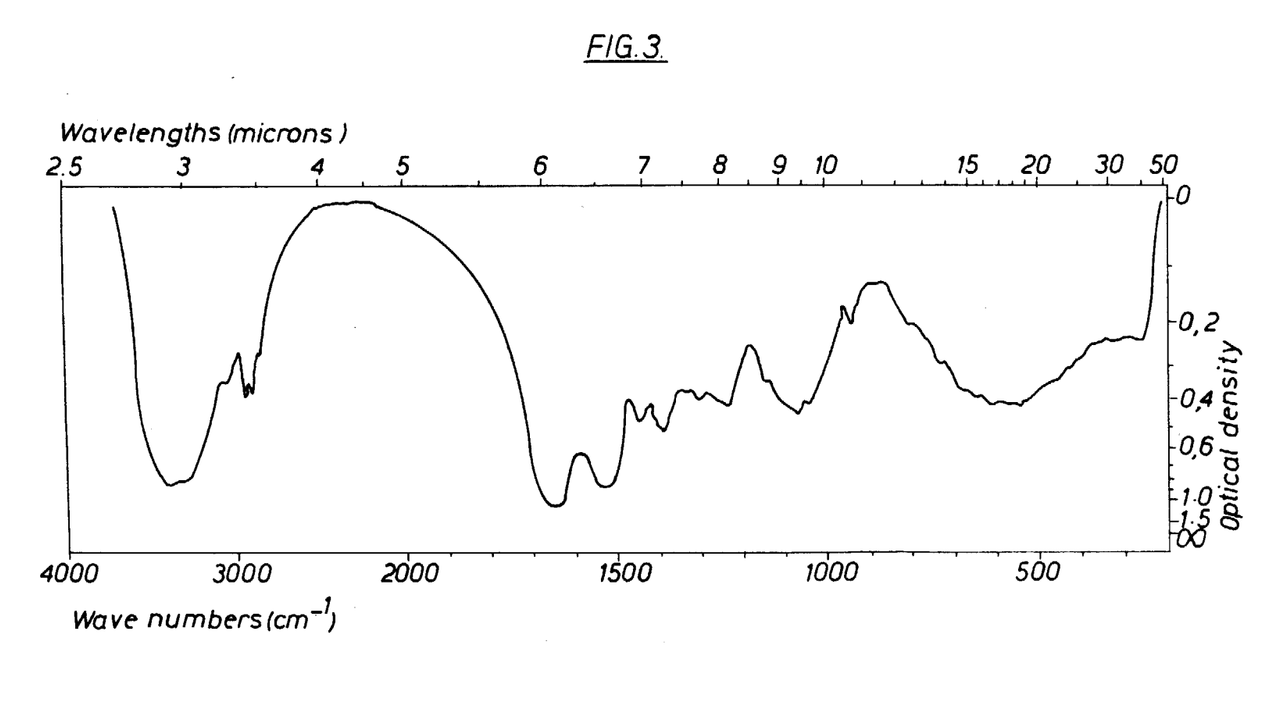

This spectrum is shown in FIG. 3, in which the abscissae, give the wavelength expressed in microns (upper scale) and the wave number in $cm^{-1}$ (lower scale) and ordinate gives the optical density.

In the table below, the principal infra-red absorption bands for this product are indicated:

| | | |
|---|---|---|
| 3,410 vS | 1,445 m | 940 m |
| 3,300 sh | 1,385 m | 810 w |
| 3,070 sh | 1,330 vw | 735 sh |
| 3,015 sh | 1,300 w | 690 sh |
| 2,950 m | 1,235 m | 650 sh |
| 2,920 m | 1,145 w | 610 sh |
| 2,860 w | 1,120 vw | 550 S |
| 2,840 sh | 1,090 sh | 480 sh |
| 1,645 vS | 1,070 S | 460 sh |
| 1,535 vS | 1,045 m | 420 sh | vS = very strong
m = medium
vw = very weak
S = strong
w = weak
sh = shoulder

Optical rotation: (determination from a 0.5% strength solution in water)

$[\alpha]_D^{23} = -10.3 \pm 0.3°$
$[\alpha]_{436}^{23} = -17.7 \pm 0.3°$

The activity of this product on various substrates is indicated in the table below:

| Reaction | Substrate | Activity (KU/g.) |
|---|---|---|
| Proteolysis | Casein | 7,000 |
| | Azo-casein | 15,700 |
| | Gelatine | 1,000 |
| Fibrinolysis | Clot of bovine fibrin | 2,500 |
| | Clot of rabbit plasma | 4,100 |
| | Clot of dog plasma | 200,000 |
| Esterolysis | B.A.E.E. | 3,000 |
| | A.T.E.E. | 500 |

EXAMPLE 3

The product (22.8 g.), prepared as described in Example 1, stages A to E, but of strength 2,400 K.U./g., is dissolved in distilled water (480 cc.); the pH of the solution is 7.4. The following operations are carried out at +4°C.

The solution is placed at the top of a column of cellulose, 15 cm. in diameter, containing cellulose impregnated with distilled water over a height of 17 cm. Elution is carried out with distilled water at a flow rate of 950 cc./hour. The optical density of the eluate is measured continuously by a UVICORD L.K.B. analyser at 280 nm. A suitable plot of the results obtained shows an asymmetric peak containing the enzyme, whilst the traces of 6,9-diamino-2-ethoxy-acridine lactate contained in the product remain attached to the cellulose. The eluate corresponding to the ultra-violet absorbing fractions is collected (total volume 6.9 litres) and concentrated, without exceeding 25°C., under reduced pressure (2mm.Hg) until the volume is 480 cc.

The above concentrate (475 cc.) is diluted with isopropanol (205 cc.) cooled to −10°C. and the solution obtained is placed at the top of a column of cellulose impregnated with a mixture of isopropanol and water containing 30% (by volume) of alcohol. The column is 15 cm. in diameter and contains 600 g. of dry cellulose (height of cellulose 7 cm.). Elution is carried out with the same mixture at a flow rate of 450 cc./hour, whilst continuously measuring the optical density of the eluate at 280 nm by means of a UVICORD L.K.B. analyser. The eluate is collected in fractions of about 20 cc. A suitable plot of the results obtained shows two asymmetric peaks. After elution of the second peak (about 10 litres of eluate), the proportion of water in the mixture is increased linearly until it is 100% (total volume of the eluent with a composition gradient: approximately 22.5 litres) and then the elution is completed by means of distilled water until fractions are obtained which show substantially no absorption at 280 nm (total volume approximately 16 litres). The last ultra-violet absorbing peak eluted by the water consists of the fractions between 950 and 1,150.

These fractions are combined (total volume 11.6 litres), concentrated under reduced pressure (2 mm. Hg) until the volume in 150 cc. and then lyophilised.

A product (4.5 g.) of strength 6,400 K.U./g. and containing, according to electrophoretic analysis, approximately 60% of active factor, is thus obtained.

The product (1.5 g.), prepared as described above and of strength 6,400 K.U./g. is dissolved in a $2 \times 10^{-4}$ M solution of sodium chloride (15 cc.), cooled to +4°C.

This solution is placed at the top of a Biogel-P.60 column, equilibrated at +4°C. with the same solvent. The column has a diameter of 7.5 cm. and contains swollen gel to a height of 122 cm (which corresponds to approximately 280 g. of dry gel). Elution is carried out with the same solvent at a flow rate of 120 cc./hour. The eluate is collected in fractions of approximately 35 cc. and its optical density is measured continuously by means of a UVICORD L.K.B. analyser at 280 nm. A suitable plot of the results obtained shows a symmetric peak in its principal part with a shoulder at the start of elution which reveals the presence of an absorbing impurity.

The absorbing fractions, except those which correspond to the impurity eluted before the principal product, that is to say the fractions 65 to 80 (total volume 580 cc.), are combined, concentrated under reduced pressure (2 mm. Hg) to a volume of 100 cc. and lyophilised.

A product (387 mg.), of strength 11,000 K.U./g. and containing, according to electrophoretic analysis, only one protein constituent (more than 95% of active factor), is thus obtained.

This product, i.e. 22,750 RP, has the physicochemical properties heretofore specified in relation to the enzyme.

The present invention also provides therapeutic compositions, comprising RP 22,750 RP in association with one or more pharmaceutically acceptable carriers or diluents and/or another physiologically active substance, and especially compositions suitable for intravenous or percutaneous administration. Compositions for percutaneous administration may be especially in the form of creams or emulsions. Compositions for intravenous administration may be in the form of sterile aqueous or non-aqueous solutions. As solvent or vehicle there may be used dilute aqueous solutions of propylene glycol, polyethylene-glycol or glucose. Sterilisation may be effected by a number of methods, for example by using a bacteria-retaining filter or by incorporating sterilising agents in the composition. They can also be prepared in the form of sterile compositions which may be dissolved at the time of use in sterile water or other sterile injectable medium.

The dosage to be used depends upon the desired therapeutic effect and the duration of treatment. It may vary between 1 and 50 mg. of active product per day for an adult, in one or more injections.

In general, the most appropriate posology will be determined by the physician taking into account the age, weight and other factors peculiar to the subject treated.

The following Example illustrates pharmaceutical composition according to the invention.

EXAMPLE 4

22,750 RP (1 g.) is dissolved in water (500 cc.). The solution obtained is filtered through a bacteria-retaining filter. The sterile solution is transferred aseptically into ampoules (5 cc. per ampoule) and then lyophilised. At the time of use, the contents of the ampoule are dissolved in 5 cc of solvent suitable for intravenous injection.

We claim:

1. A proteolytic enzyme which is thrombolytic and fibrinolytic and produced by *streptomyces venetus* DS 24,288 (NRRL 3987), or a mutant thereof capable of producing the said enzyme, which enzyme has the following characteristics: it is a white powder which is very soluble in water, soluble in aqueous-alcoholic and aqueous-acetone mixtures, very sparingly soluble in concentrated solutions of neutral salts or of polyethylene glycol and insoluble in anhydrous alcohols, acetone, hexane, ethyl acetate, diethyl ether and chlorinated solvents; it is a protein containing carbon, hydrogen, oxygen, nitrogen and sulphur, the elementary composition of which is approximately C=50.4%, H=7.35%, N=17% and S=0.50%; its specific optical rotation is $[\alpha]_D^{20} = -14° \pm 0.5°$, $[\alpha]_{436}^{20} = -29.2° \pm 0.6°$, $[\alpha]_{365}^{20} = -53.5° \pm 0.8°$, (C=0.02; water); its ultraviolet spectrum (aqueous solution) shows absorptions at 210 nm ($E_{1cm}^{1\%} = 187$), 250 nm ($E_{1cm}^{1\%} = 4.35$) and 278 nm ($E_{1cm}^{1\%} — 13.55$); its infra-red spectrum (determined with tablets of a mixture with potassium bromide) shows principal absorption bands as follows: 3,280 very strong, 3,200 shoulder, 3,060 medium, 3,040 very weak, 2,980 shoulder, 2,960 medium, 2,935 weak, 2,880 shoulder, 2,650 shoulder, 1,650 very strong, 1,535 very strong, 1,515 medium, 1,490 shoulder, 1,465 very weak, 1,455 very weak, 1,445 medium, 1,435 shoulder, 1,418 shoulder, 1,405 weak, 1,398 shoulder, 1,385 medium, 1,375 shoulder, 1,365 shoulder, 1,330 very weak, 1,303 weak, 1,280 shoulder, 1,235 medium, 1,165 weak, 1,145 very weak, 1,110 medium, 1,075 medium, 1,055 very weak, 1,040 very weak, 927 very weak, 920 very weak, 825 very weak, 735 very weak, 695 weak, about 600 medium and wide 530 weak, 470 shoulder, 430 weak; its molecular weight, as determined by its chromatographic behaviour on a dextran or polyacrylamide gel, is 40,000 ± 5,000, and acid hydrolysis demonstrates the presence of the following amino acids, for which the content is millimol per 10 g. of product is given: aspartic acid (11.5), threonine (8.5), serine (7), glutamic acid (3.5), proline (2.5), glycine (13), alanine (7), valine (4.5), methionine (1), isoleucine (2.5), leucine (4), tyrosine (5), phenylalanine (2), lysine (3), arginine (2.5) and histidine (2).

2. Process for the production of the enzyme of claim 1 which comprises aerobically cultivating *Streptomyces venetus* DS 24,288 (NRRL 3987), or a mutant thereof capable of producing the said enzyme, using an aqueous nutrient medium containing assimilable sources of carbon, nitrogen, and inorganic substances, and isolating from the medium said enzyme formed during culturing.

3. Process according to claim 2 in which the culture is effected under submerged aerobic culture conditions commencing at a pH within the range 6.0 to 7.8 and at a temperature of 23° to 40°C.

4. Process according to claim 3 in which the pH of the culture medium at the beginning of the culture is between 6.4 and 7.5.

5. Process according to claim 3 in which the temperature of the culture medium is 25°-28°C.

6. Process according to claim 3 in which the culture medium is aerated at a rate of 0.3 to 2 litres of air per litre of medium per minute.

7. Process according to claim 2 in which said enzyme is isolated from the culture medium by filtering in the presence of a filtration aid, concentrating the filtrate under reduced pressure, acidifying the filtrate to a pH of about 4, filtering and then dialysing the filtrate against distilled water and then precipitating said enzyme by adding acetone to the dialysate.

8. Process according to claim 7 in which said enzyme is purified by dissolution in distilled water followed by precipitation by addition of concentrated aqueous solutions of agents in which said enzyme is insoluble.

9. Process according to claim 8 in which the enzyme is precipitated by the addition of a concentrated aqueous solution of sodium chloride or ammonium sulphate.

10. Process according to claim 7 in which said enzyme is purified by chromatography on alumina, cellulose powder, dextran or polyacrylamide gel, by dialysis or by preparative electrophoresis.

* * * * *